Figure 1:
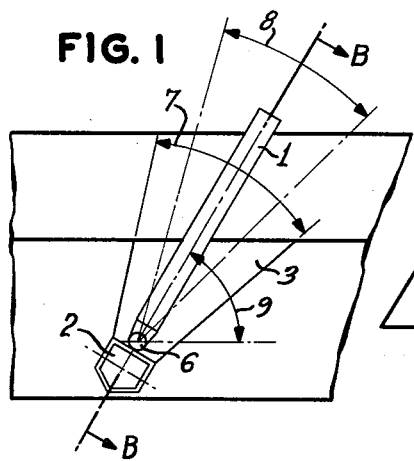

Jan. 19, 1965   K. BOHRMANN   3,165,973
MANNER OF MOUNTING HEAVY ARMS IN VEHICLES
Filed March 12, 1963

INVENTOR.
KURT BOHRMANN
BY
ATTORNEY

United States Patent Office 3,165,973
Patented Jan. 19, 1965

3,165,973
MANNER OF MOUNTING HEAVY ARMS
IN VEHICLES
Kurt Bohrmann, Kassel, Germany, assignor to Henschel-Werke A.G., Kassel, Germany, a corporation of Germany
Filed Mar. 12, 1963, Ser. No. 264,498
Claims priority, application Germany Mar. 13, 1962
6 Claims. (Cl. 89—40)

This invention relates to a mount for heavy arms in vehicles and more particularly to a mount for a cannon, such as a mortar, in a vehicle having a channel-type frame, such as a self-propelled gun carriage, a half-track or the like.

As is known, mounts for heavy arms such as rifled cannons, mortars, howitzers, and the like, must be capable of withstanding and transmitting the considerable recoil of the weapon to a support. Aside from the requisite strength of the gun mount, three additional conditions must be fulfilled; first, the mount must transmit the recoil forces of the arm to the body or frame of the vehicle in which the weapon is mounted in a manner such that the body or frame is neither damaged or substantially deformed by the recoil forces acting upon it. Secondly, the rigidity of the mount must be as great as possible, in order to maintain deformations of the gun mount at a minimum during firing and thereby decrease inaccuracies of firing. Third, the weight of the mount should be as low as possible, consistent with the requisite rigidity. The present invention provides a gun mount which meets all of the aforementioned conditions.

In cannon mounts known to the prior art, a girder or cross-brace is transversely secured to the frame or body of a carrying vehicle, and the heavy arm, for example a mortar, is supported with the lower end thereof approximately in the center of the vehicle. The ends of the transverse girder are connected to the vehicle frame by welding and, accordingly, stresses are applied during firing to the welded seams between the transverse girder and the longitudinal frame members. Particularly in cases where the cannon is a mortar, these welded seams may be damaged, i.e., torn open, during firing of the cannon where the angle of elevation of the cannon barrel is other than 90° to the horizontal. This condition has been heretofore alleviated by providing several reinforcing lugs at the ends of the transverse girder or cross-brace, the thickness at the ends of the girder being increased by welding these lugs to the side walls of the frame of the vehicle, beginning at the bottom thereof. In such a construction, however, the lugs and the welded seams do not extend to the tops of the side walls of the vehicle frame.

In accordance with the present invention, a substantially U-shaped member is used to support a cannon. This member comprises a lower horizontal support member, i.e., a girder or beam which is mounted transversely to the longitudinal axis of the vehicle frame, and a side arm rigidly connected to each end of the girder, the side arms extending substantially parallel to the side walls of the channel-type vehicle frame to the upper edges of the sides of the channel.

In order to transmit the recoil forces from the weapon to the vehicle frame, the substantially U-shaped supporting frame is attached at the upper ends of the side arms to the top edges of the side walls of the channel-type frame where the latter have horizontal portions connected thereto, these horizontal portions being positioned above the caterpillar tracks in a half-track, for example. Thus, the side walls of the channel-type frame are utilized as supports for the side arms of the cannon mount.

A number of advantages result from the construction of the present invention, i.e., the application of the recoil force of the cannon to the vehicle frame is effected at points which are substantially more rigid and considerably less susceptible to damage of welded seams on the vehicle frame than is the case in constructions heretofore known. The lower portion of the vehicle frame is completely relieved from load since the cannon mount is not connected to the lower part of the vehicle frame. Further, due to the rigid connection of the side arms of the cannon mount to the horizontal transverse member or beam, which is positioned transversely to the longitudinal axis of the vehicle, the side arms exert a clamping effect on the horizontal beam at the ends thereof when the cannon is fired in the direction of travel, this clamping effect being absent in heretofore known constructions. As a further result of the construction of the present invention, deformations of the horizontal beam of the cannon mount are prevented, which results in a more favorable ratio between rigidity and structural weight of the mount for the cannon, as compared with heretofore known constructions.

The cannon mount of the present invention is also superior to heretofore known constructions when the cannon is fired at side angles of elevation other than 0° to the vertical. In previously known constructions, those components of the recoil forces of the cannon, which are transverse to the longitudinal axis of the vehicle and, therefore, to the direction of travel of the vehicle, must be absorbed by the side walls of the vehicle frame and, thus, they are effective at right angles to the sheet metal supporting surface, which has an adverse effect upon rigidity. In the cannon mount according to the present invention, those components of the recoil force which are transverse to the longitudinal axis of the vehicle and to the direction of travel, are applied to the vehicle frame through the side arms of the cannon mount at those points on the vehicle frame where the horizontal portions of the frame, which extend over the tracks, reinforce the channel-type frame and, due to the strength of the frame at these points, it is much better able to absorb the components of the recoil forces transmitted thereto.

Further, in the cannon mount of the present invention, the main plane of the horizontal support member or girder and the two side arms connected thereto is inclined to the horizontal at an angle equivalent to the mean angle of elevation of the mortar barrel. Also, the supporting surface of the transverse horizontal beam or girder is inclined to the horizontal at an obtuse angle equivalent to the mean angle of elevation of the mortar barrel plus 90°. The side arms of the cannon mount are tapered from the top to the bottom and the angle enclosed by the tapered sides of the side arms is greater than the angular field of fire traversed by the cannon barrel in a plane normal to the longitudinal plane of the vehicle.

Due to the decreasing bending moments of the side arms in a vertical direction, they may be so constructed that the moment of inertia of the cross-sectional areas thereof is reduced in a vertical direction about an axis of inertia parallel to the side walls of the vehicle frame.

It has also been found to be of advantage to construct the transverse horizontal beam or girder of the cannon mount in a box type configuration of pentagonal cross-section.

Figure 2:
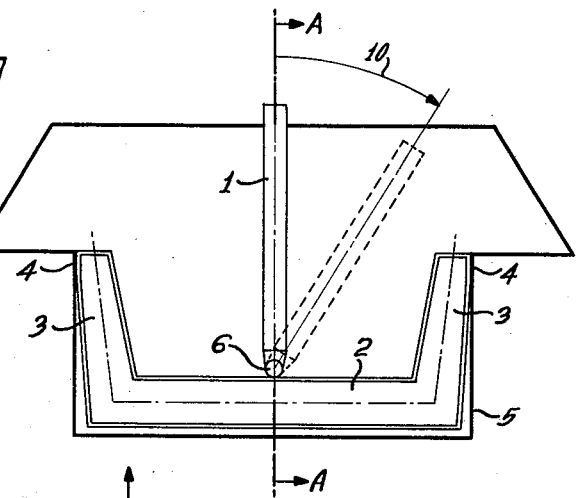
Figure 3:
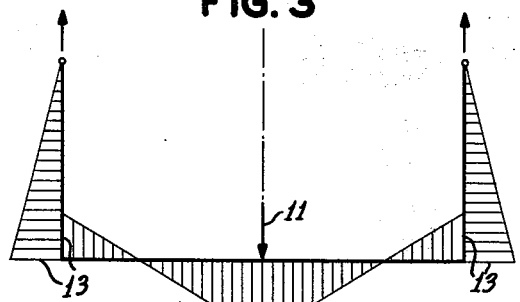
Figure 4:
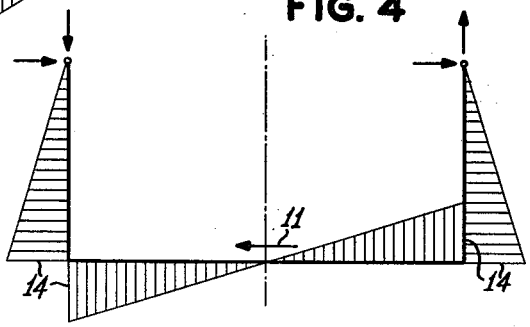
Figure 5:
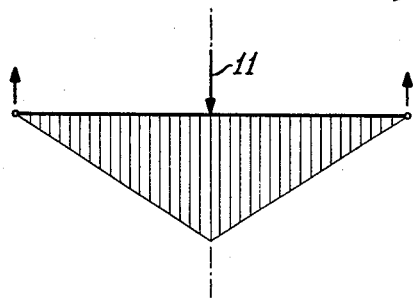

The invention will be further illustrated by reference to the accompanying drawings in which:

FIGURE 1 is a fragmentary sectional view taken on line A—A of FIGURE 2, and looking in the direction of the arrows, showing the novel cannon mount of the present invention positioned in a vehicle body, FIGURE 2 is a schematic view in cross-section taken on line B—B of FIGURE 1, FIGURE 3 shows the bending moments acting on the cannon mount of the invention during firing in the direction of travel of the vehicle, FIGURE 4 shows the bending moments acting on the cannon mount of the invention for a component of the recoil force of the cannon which is transverse to the direction of travel, and FIGURE 5 shows the bending moments applied to a conventional transverse girder or cross-brace secured to the frame members of a vehicle.

Referring to FIGURE 1, a heavy arm 1, such as a mortar, is supported on a horizontal beam or girder 2 having a side arm 3 connected at each end thereof in a rigid manner. The side arms 3 are attached to the channel-type frame 5 of the carrying vehicle only at the points 4 where the vertical sides of the channel-type frame adjoin horizointal portions thereof which extend over the tracks of a half-track, for example. The cannon 1 is pivotally mounted on the beam or girder 2 by means of a conventional universal socket 6. As shown in FIGURE 1, the side arms 3 are tapered at the lower ends thereof in a manner such that the angle 7 enclosed by the tapered sides of the side arms is equal to or greater than the angular field of fire 8 traversed by the mortar barrel in a plane normal to the longitudinal plane of the vehicle.

The surface of the horizontal beam or girder 2 is also inclined to the horizontal at an obtuse angle equivalent to the mean angle of elevation of the mortar barrel plus 90°, and is fabricated in pentagonal cross-section in order to fully utilize the available space at the bottom of the vehicle frame, to obtain the desired rigidity, and to maintain the supporting surface thereof normal to the plane of the mean angle of elevation of the cannon.

In FIGURE 2, there is also shown the position of the mortar 1 at a side angle other than 0° with respect to the vertical. When firing in the direction of travel, the side angle is 0°.

In FIGURE 3 is shown the bending moments applied to the cannon mount during firing in the direction of travel of the vehicle, the recoil force being indicated at 11, while FIGURE 4 shows the bending moments applied to the cannon mount by the recoil of the mortar in a direction transverse to the direction of travel during firing at a side angle, as indicated at 10 in FIGURE 2, other than 0°. For reasons of simplicity, these figures show the attachment of the upper ends of the side arms 3 to the vehicle frame in a hinged manner, but it is understood that the present invention is not limited to any particular method of attachment of the side arms to the vehicle frame.

In FIGURES 3 and 4 are shown the clamping moments 13 and 14, respectively, for the horizontal beam or girder 2 as a result of the present manner of mounting a cannon with the side arms 3 being connected with the horizontal beam in a rigid fashion.

As a comparison, FIGURE 5 shows the distribution of the bending moments in a conventional type cannon mount which includes only a beam or cross-brace on a vehicle frame without the side arms of the present invention. The type of stress exerted on the beam or cross-brace, as shown in FIGURE 5, obviously is less desirable than the type of stress shown in FIGURE 3. The maximum bending moments are smaller in FIGURE 3 than in FIGURE 5 and a calculation of the bending lines also shows that the deflection at the mounting point of the cannon is considerably smaller in a construction of the type illustrated in FIGURE 3 than the type illustrated in FIGURE 5.

It will be obvious to those skilled in the art that many modifications may be made within the scope of the present invention without departing from the spirit thereof, and the invention includes all such modifications.

What is claimed is:

1. A vehicular mount for a heavy firearm, including a vehicle having channel-type frame with a longitudinal axis, a horizontal support member positioned transversely to the longitudinal axis of the vehicle frame, a side arm connected to each end of the horizontal member, each side arm being connected to one side of the vehicle frame, a heavy firearm, and means for mounting said heavy firearm on the horizontal support member.

2. A vehicular mount according to claim 1 in which the side arms are wider at the tops thereof than at the bottoms and a plane angularly bisecting the side arms and passing through the horizontal support member is inclined to the horizontal at an angle equivalent to the mean angle of elevation of the firearm barrel.

3. A vehicular mount according to claim 1 in which the heavy firearm is a mortar.

4. A vehicular mount according to claim 1 in which the supporting surface of the horizontal support member is inclined to the horizontal at an obtuse angle equivalent to the mean angle of elevation of the firearm barrel plus 90°.

5. A vehicular mount according to claim 1 in which the side arms are wider at the tops thereof than at the bottoms, the angle enclosed by the tapered sides of the sidearms being greater than the angular field of fire traversed by the firearm barrel in a plane normal to the longitudinal plane of the vehicle.

6. A vehicular mount according to claim 1 in which the horizontal support member is a box-type girder of pentagonal cross-section.

References Cited in the file of this patent

FOREIGN PATENTS 253,149    Germany _____ Nov. 1, 1912